United States Patent
Yu et al.

(10) Patent No.: US 10,637,252 B2
(45) Date of Patent: Apr. 28, 2020

(54) ELECTRICAL ENERGY CONTROL METHOD AND APPARATUS FOR PHOTOVOLTAIC SYSTEM

(71) Applicant: SUNGROW POWER SUPPLY CO., LTD., Hefei Anhui (CN)

(72) Inventors: Yanfei Yu, Hefei Anhui (CN); Hua Ni, Hefei Anhui (CN); Zongjun Yang, Hefei Anhui (CN)

(73) Assignee: SUNGROW POWER SUPPLY CO., LTD., Hefei, Anhui (CN)

( * ) Notice: Subject to any disclaimer, the term of this patent is extended or adjusted under 35 U.S.C. 154(b) by 145 days.

(21) Appl. No.: 15/907,779

(22) Filed: Feb. 28, 2018

(65) Prior Publication Data

US 2018/0287389 A1    Oct. 4, 2018

(30) Foreign Application Priority Data

Mar. 29, 2017   (CN) .......................... 2017 1 0197467

(51) Int. Cl.
*H02J 3/38*     (2006.01)
*H02S 40/30*    (2014.01)
*H02M 3/158*    (2006.01)

(52) U.S. Cl.
CPC .............. *H02J 3/383* (2013.01); *H02S 40/30* (2014.12); *H02M 3/158* (2013.01); *Y02E 10/563* (2013.01)

(58) Field of Classification Search
CPC ........ H02J 3/383; Y02E 10/563; H02S 40/30; H02M 3/158
See application file for complete search history.

(56) References Cited

U.S. PATENT DOCUMENTS

| | | | |
|---|---|---|---|
| 2014/0266294 A1* | 9/2014 | Willis | H02S 50/10 324/764.01 |
| 2015/0318784 A1* | 11/2015 | Wu | H02M 3/158 323/283 |
| 2017/0163311 A1* | 6/2017 | Kahn | H04B 3/548 |

FOREIGN PATENT DOCUMENTS

| | | | | |
|---|---|---|---|---|
| CN | 102624022 A | 8/2012 | | |
| CN | 104333213 | * | 2/2015 | ........... H02H 7/1222 |

(Continued)

OTHER PUBLICATIONS

SIPO First Office Action corresponding to Application No. 201710197467.3; dated Nov. 5, 2018.

(Continued)

*Primary Examiner* — Jared Fureman
*Assistant Examiner* — Duc M Pham
(74) *Attorney, Agent, or Firm* — Cantor Colburn LLP (57) ABSTRACT

An electrical energy control method and an electrical energy control apparatus for a photovoltaic system are provided. With the electrical energy control apparatus, a photovoltaic module meeting a preset electrical energy reverse flow condition is controlled to receive electrical energy stored on a direct current capacitor of the electrical energy control apparatus. That is, the photovoltaic modules are separately controlled to be heated by corresponding electrical energy control apparatuses, so as to avoid the issue in conventional technologies that, due to unified heating, excessive reverse power is received by some modules and causes performance degradation or damage of the modules, thereby ensuring that each of the photovoltaic modules is safely and reliably controlled to be heated for snow melting and deicing.

11 Claims, 6 Drawing Sheets

(56) References Cited

FOREIGN PATENT DOCUMENTS

CN  104333213 A  2/2015
JP  2016100918 A  5/2016

OTHER PUBLICATIONS

"National Electrical Code," NFPA 70, International Electrical Code Series; USA, 2017, pp. 1-881.

* cited by examiner

Prior Art

ELECTRICAL ENERGY CONTROL METHOD AND APPARATUS FOR PHOTOVOLTAIC SYSTEM

CROSS REFERENCE TO RELATED APPLICATION

The present application claims priority under 35 U.S.C. § 119 to Chinese Application No. 201710197467.3 filed Mar. 29, 2017, the entire content of which is incorporated herein by reference in its entirety.

TECHNICAL FIELD

The present disclosure relates to the technical field of photovoltaic power generation, and in particular to an electrical energy control method and an electrical energy control apparatus for a photovoltaic system.

BACKGROUND

Generally, a photovoltaic system includes a photovoltaic array, an inverter and a load (and/or a power grid). The photovoltaic array includes one or more photovoltaic modules connected in series-parallel, and converts received light energy into direct-current electrical energy for output. The direct-current electrical energy outputted by the photovoltaic array is converted into alternating-current electrical energy by the inverter, to supply power to the load or be fed into the power grid.

In some cases such as snow melting and deicing, the photovoltaic system needs to absorb electrical energy from the power grid to heat the photovoltaic module. However, due to different parameters of the photovoltaic modules and the non-uniformity of the snow and ice, power consumed by the photovoltaic modules are different under a fixed total power, and thus some modules may receive excessive reverse power which causes performance degradation or damage.

SUMMARY

An electrical energy control method and an electrical energy control apparatus for a photovoltaic system are provided according to the present disclosure, to address an issue in conventional technologies that some modules receive excessive reverse power which causes performance degradation or damage.

The technical solutions according to the present disclosure are as follows.

An electrical energy control method for a photovoltaic system is provided. The method is applied to an electrical energy control apparatus. The electrical energy control apparatus has one end connected to a photovoltaic module and the other end arranged with a direct current capacitor. The method includes:

determining, by the electrical energy control apparatus, whether a preset electrical energy reverse flow condition is met;

controlling the photovoltaic module to stop outputting electrical energy, if the electrical energy control apparatus determines the preset electrical energy reverse flow condition is met; and controlling to transmit electrical energy on the direct current capacitor to the photovoltaic module.

Preferably, the preset electrical energy reverse flow condition is that:

a voltage across the direct current capacitor is greater than a first threshold or less than a second threshold;

or output power of the photovoltaic module is less than a third threshold, or an output current of the photovoltaic module is less than a fourth threshold.

Preferably, the preset electrical energy reverse flow condition is that:

an amplitude of an electrical parameter corresponding to a preset frequency is less than a threshold, or a ratio of an amplitude of an electrical parameter corresponding to the preset frequency to a sum of amplitudes of the electrical parameter corresponding to a preset frequency band is less than a threshold; where the preset frequency is a multiple of a power grid voltage frequency, a multiple of a characteristic frequency of an inverter, or a multiple of a resonant frequency of the photovoltaic system; and the electrical parameter is an input voltage of the direct current capacitor, an input current of the direct current capacitor, input power of the direct current capacitor, an output voltage of the photovoltaic module, an output current of the photovoltaic module, or output power of the photovoltaic module.

Preferably, the preset electrical energy reverse flow condition is that:

a reverse electrical energy transmission control instruction is received.

Preferably, the reverse electrical energy transmission control instruction is received by at least one of a wired communication, a wireless communication, a direct current power line carrier communication, an external button control and an external switch control.

Preferably, while controlling to transmit the electrical energy on the direct current capacitor to the photovoltaic module, the electrical energy control method for the photovoltaic system further includes:

limiting an output current of the direct current capacitor, output power of the direct current capacitor, an input current of the photovoltaic module, input power of the photovoltaic module or an input voltage of the photovoltaic module, to prevent the photovoltaic module from absorbing excessive electrical energy.

Preferably, while controlling to transmit the electrical energy on the direct current capacitor to the photovoltaic module, the electrical energy control method for the photovoltaic system further includes:

controlling the voltage across the direct current capacitor to be less than or equal to the first threshold.

Preferably, the controlling to transmit the electrical energy on the direct current capacitor to the photovoltaic module includes:

controlling to transmit the electrical energy on the direct current capacitor to the photovoltaic module by a boost conversion.

An electrical energy control apparatus for a photovoltaic system is provided. The apparatus includes a power transmission circuit and a controller, where the controller is configured to perform any one of the aforementioned electrical energy control methods for the photovoltaic system; and the power transmission circuit includes:

a controllable switch, configured to switch off in response to a control from the controller, to stop the photovoltaic module from outputting electrical energy; and a direct-current/direct-current (DC/DC) converter, configured to reversely transmit electrical energy in response to a control from the controller, to transmit the electrical energy on the direct current capacitor to the photovoltaic module.

Preferably, the DC/DC converter is a half-bridge converter with a function of bidirectional electrical energy conversion; and the controllable switch is a Metallic Oxide Semiconductor Field Effect Transistor (MOSFET) or an Insulated Gate Bipolar Transistor (IGBT) arranged in the half-bridge converter, and the controllable switch further comprises a body diode configured to transmit the electrical energy on the direct current capacitor to the photovoltaic module.

The electrical energy control method and the electrical energy control apparatus for the photovoltaic system are provided according to the present disclosure. With the electrical energy control apparatus, the photovoltaic module meeting the preset electrical energy reverse flow condition is controlled to receive the electrical energy stored on the direct current capacitor of the electrical energy control apparatus. That is, the photovoltaic modules are separately controlled to be heated by corresponding electrical energy control apparatuses, so as to avoid the issue in the conventional technologies that, due to unified heating, excessive reverse power is received by some modules and causes performance degradation or damage of the modules, thereby ensuring that each of the photovoltaic modules is safely and reliably controlled to be heated for snow melting and deicing.

BRIEF DESCRIPTION OF THE DRAWINGS

The drawings to be used in the description of the embodiments or the conventional technology will be described briefly as follows, so that the technical solutions according to the embodiments of the present disclosure or according to the conventional technology will become clearer. Apparently, the drawings in the following descriptions only illustrate some embodiments of the present disclosure, and other drawings may be obtained by those skilled in the art based on these drawings without any creative effort.

DETAILED DESCRIPTION OF THE EMBODIMENTS

Hereinafter, the technical solutions according to the embodiments of the present disclosure will be described clearly and completely in conjunction with the drawings. It is apparent that the described embodiments are only a few rather than all the embodiments according to the present disclosure. Any other embodiments obtained by those skilled in the art based on the embodiments in the present disclosure without any creative efforts fall within the protection scope of the present disclosure.

An electrical energy control method for a photovoltaic system is provided according to the present disclosure, to address an issue in conventional technologies that excessive reverse power is received by some modules and causes performance degradation or damage.

Figure 1:
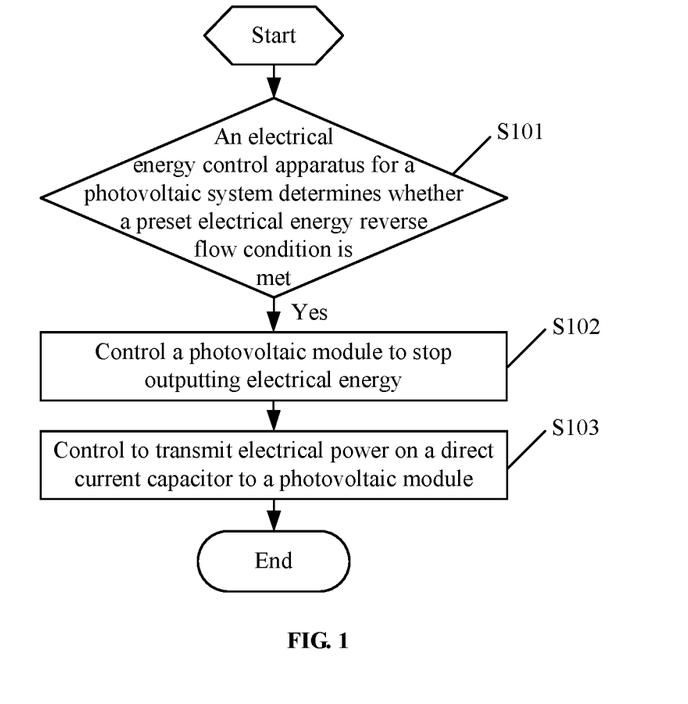
FIG. 1 is a flowchart of an electrical energy control method for a photovoltaic system according to an embodiment of the present disclosure.

Referring to FIG. 1, the electrical energy control method for the photovoltaic system is applied to an electrical energy control apparatus. The electrical energy control apparatus has one end connected to a photovoltaic module, and the other end arranged with a direct current capacitor. The electrical energy control method for the photovoltaic system includes steps S101 to S103.

In S101, the electrical energy control apparatus determines whether a preset electrical energy reverse flow condition is met.

In a practical application, the preset electrical energy reverse flow condition may be set according to circumstances. For example, the preset electrical energy reverse flow condition may be that a voltage across the direct current capacitor is greater than a first threshold or less than a second threshold.

For example, the first threshold is set as V1=60V, and the second threshold is set as V2=10V. In a case that the voltage across the direct current capacitor is Vin=70V>V1, it is indicated that the direct current side of the photovoltaic system needs an overvoltage protection. In a case that the voltage across the direct current capacitor is Vin=9V<V2, it is indicated that the photovoltaic system is in a stopped state and electrical energy on a direct current bus should be consumed to make a voltage on the direct current bus rapidly reach a safe voltage.

Step S102 is performed in a case that the electrical energy control apparatus determines that the preset electrical energy reverse flow condition is met, for example, the voltage across the direct current capacitor is greater than the first threshold or less than the second threshold.

In S102, the photovoltaic module is controlled to stop outputting electrical energy.

In S103, it is controlled to transmit electrical energy in the direct current capacitor to the photovoltaic module.

No matter whether the direct current side of the photovoltaic system needs an overvoltage protection or the photovoltaic system is in the stopped state, a forward electrical energy transmission, i.e., the electrical energy transmission from the photovoltaic module to an inverter, should be stopped, and a reverse electrical energy transmission, i.e., the electrical energy transmission from the direct current capacitor to the photovoltaic module, should be performed to consume the electrical energy stored on the direct current capacitor, thereby decreasing the voltage on the direct current bus.

In the electrical energy control method for the photovoltaic system according to the embodiment, the electrical energy control apparatus controls the photovoltaic module meeting the preset electrical energy reverse flow condition to receive the electrical energy stored on the direct current capacitor of the electrical energy control apparatus. That is, each of the photovoltaic modules is controlled by a corresponding electrical energy control apparatus to be heated, so as to avoid the issue in the conventional technologies that, due to unified heating, excessive reverse power is received by some modules and causes performance degradation or damage of the modules, thereby ensuring that each of the photovoltaic modules is safely and reliably heated for snow melting and deicing.

In addition, the electrical energy reverse flow condition can be preset to be met in each electrical energy control apparatus of the photovoltaic system when the photovoltaic system is shut down, so that the electrical energy on the direct current capacitor of each electrical energy control apparatus of the photovoltaic system can be transmitted reversely. In this case, electrical energy stored on the direct current capacitors can be rapidly consumed without an energy consumption apparatus in the conventional technologies.

Figure 2:
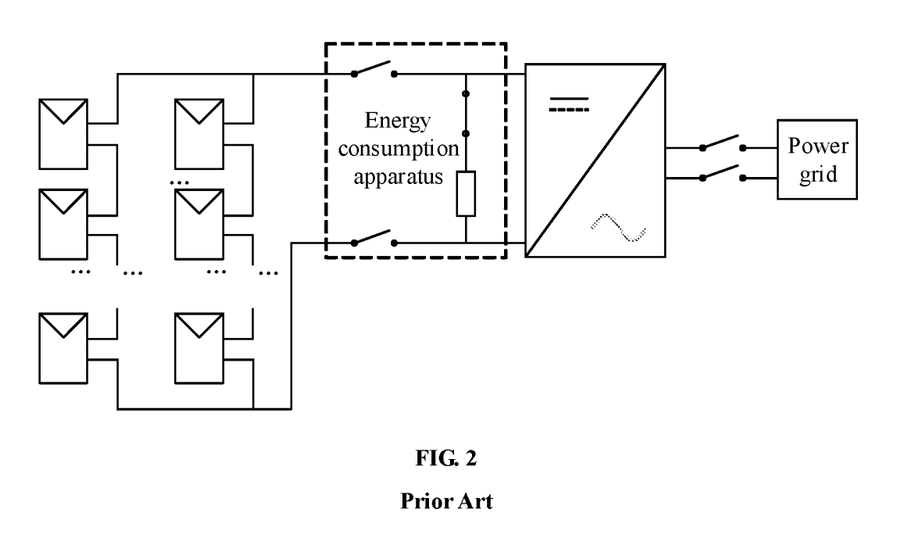
FIG. 2 is a schematic connection diagram of an energy consumption apparatus according to a conventional technology.

It should be noted that, in some situations such as a shutdown of the photovoltaic system or triggering an emergent shutdown (such as a rapid shutdown), the electrical power on the direct current bus should be rapidly consumed by the photovoltaic system, to decrease the voltage on the direct current bus and improve the security of the system. For a rapid decrease of the voltage on the direct current bus, the direct current bus in the conventional technology is generally arranged with an energy consumption apparatus including a switch and a resistor, as shown in FIG. 2. At a normal state, it is controlled that an output of the photovoltaic module is electrically connected to the inverter and the resistor of the energy consumption apparatus is disconnected from the direct current bus. When the photovoltaic system is shut down, the switch is closed to disconnect the photovoltaic module from an input end of the inverter, and connect the resistor of the energy consumption apparatus in parallel to the direct current bus at the input end of the inverter, so as to rapidly consume electrical power stored in a capacitor on the direct current bus. However in the conventional technologies, when the photovoltaic system is emergently shutdown, a voltage between any conductors at the photovoltaic module side may exceed 80V, which does not meet the new NEC2017 requirements and causes some safety risks.

In the electrical energy control method for the photovoltaic system according to the present disclosure, in a case that the voltage across the direct current capacitor is greater than the first threshold, i.e., in a case that the photovoltaic module outputs an excessive voltage, it is controlled to reversely transmit the electrical energy to the photovoltaic module, to ensure that the voltage between any conductors at the photovoltaic module side is not excessive at any time. In a case that the voltage across the direct current capacitor is less than the second threshold, i.e., in a case that the photovoltaic system is shut down or the emergent shutdown is triggered, it is also controlled to reversely transmit the electrical energy to the photovoltaic module, to rapidly consume the electrical energy stored on the capacitor on the direct current bus without the energy consumption apparatus in the conventional technologies. Therefore, with the electrical energy control method for the photovoltaic system according to the present disclosure, stored energy is consumed in a case that the photovoltaic system is shut down or the emergent shutdown is triggered, which also solves the problem in the conventional technologies that the voltage between conductors at the photovoltaic module side is excessive in a case of the emergent shutdown.

In a practical application, the preset electrical energy reverse flow condition may also be that output power of the photovoltaic module is less than a third threshold, or an output current of the photovoltaic module is less than a fourth threshold.

Figure 3:
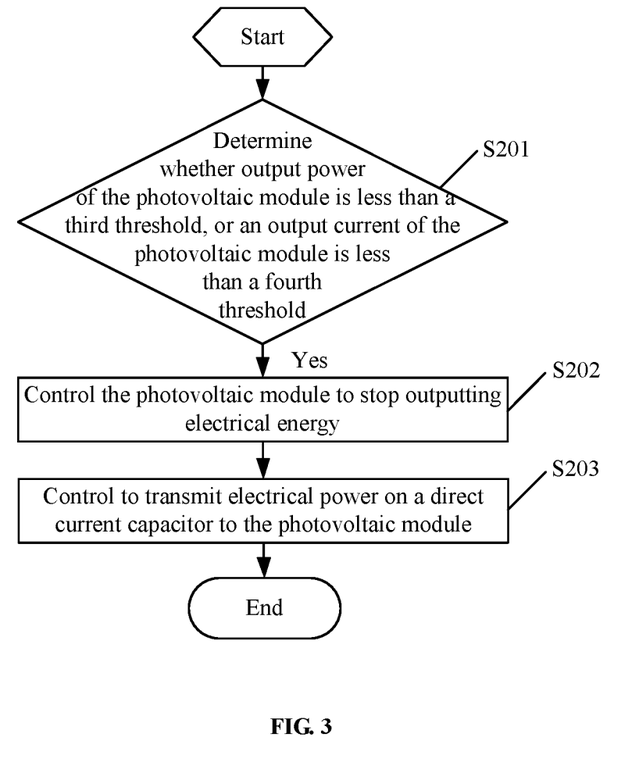
FIG. 3 is a flowchart of an electrical energy control method for a photovoltaic system according to an embodiment of the present disclosure.

Therefore, another electrical energy control method for the photovoltaic system is further provided according to an embodiment of the present disclosure. The method includes steps S201 to S203, as shown in FIG. 3.

In S201, it is determined whether the output power of the photovoltaic module is less than the third threshold, or whether the output current of the photovoltaic module is less than the fourth threshold.

Step S202 is performed if the output power of the photovoltaic module is less than the third threshold or the output current of the photovoltaic module is less than the fourth threshold.

In S202, the photovoltaic module is controlled to stop outputting the electrical energy.

In S203, it is controlled to transmit the electrical energy on the direct current capacitor to the photovoltaic module.

As another embodiment, in a case that the photovoltaic system forward transmits the electrical energy, if the output power of the photovoltaic module is less than the preset third threshold, such as 2 W, or the output current of the photovoltaic module is less than the preset fourth threshold, such as 0.05 A, then it is determined that the photovoltaic module outputs substantially no electrical energy. In this case, the photovoltaic system is controlled to reversely transmit the electrical energy, to consume the electrical energy stored on the direct current capacitor, thereby decreasing the voltage across the direct current capacitor.

Alternatively, the preset electrical energy reverse flow condition may also be that an amplitude of an electrical parameter corresponding to a preset frequency is less than a threshold, or a ratio of an amplitude of an electrical parameter corresponding to the preset frequency to a sum of amplitudes of the electrical parameter corresponding to a preset frequency band is less than a threshold.

The preset frequency is a multiple of a voltage frequency of a power grid, a multiple of a characteristic frequency of the inverter, or a multiple of a resonant frequency of the photovoltaic system.

The electrical parameter includes an input voltage of the direct current capacitor, an input current of the direct current capacitor, input power of the direct current capacitor, an output voltage of the photovoltaic module, an output current of the photovoltaic module, or output power of the photovoltaic module.

Figure 4:
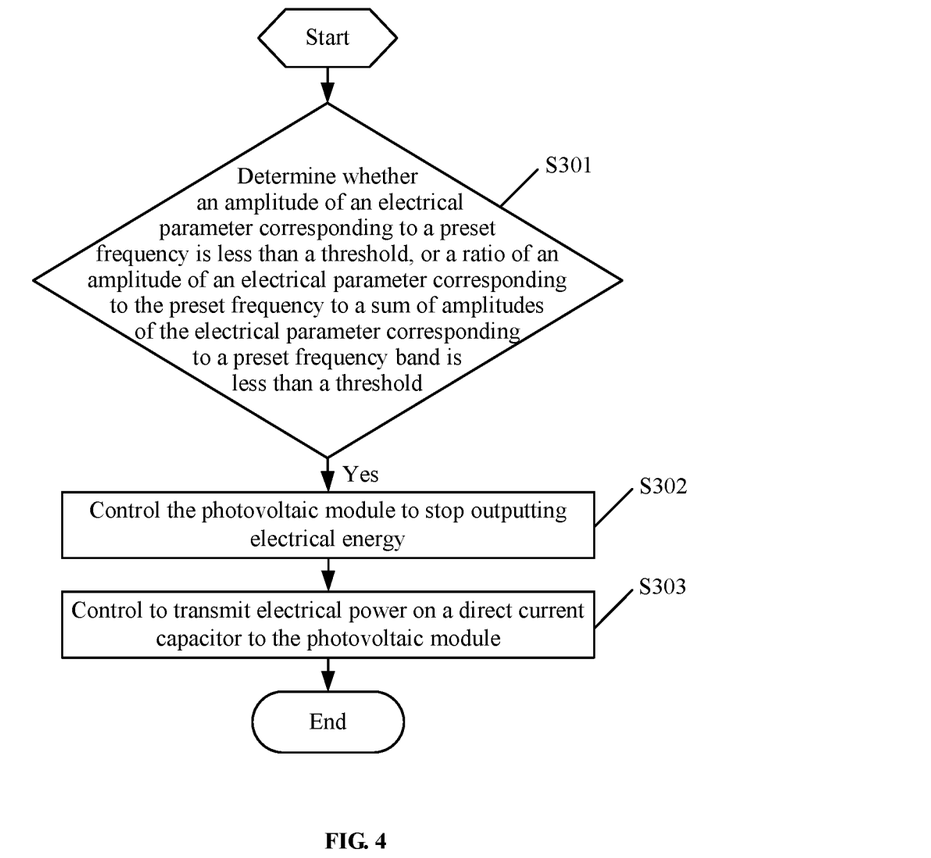
FIG. 4 is a flowchart of an electrical energy control method for a photovoltaic system according to an embodiment of the present disclosure.

Therefore, another electrical energy control method for the photovoltaic system is further provided according to an embodiment of the present disclosure. The method includes steps S301 to S303, as shown in FIG. 4.

In S301, it is determined whether an amplitude of an electrical parameter corresponding to a preset frequency is less than a threshold, or a ratio of an amplitude of an electrical parameter corresponding to the preset frequency to the sum of amplitudes of the electrical parameter corresponding to a preset frequency band is less than a threshold.

Step S302 is performed if the amplitude of the electrical parameter corresponding to the preset frequency is less than the threshold, or the ratio of the amplitude of the electrical parameter corresponding to the preset frequency to the sum of the amplitudes of the electrical parameters corresponding to the preset frequency band is less than the threshold.

In S302, the photovoltaic module is controlled to stop outputting the electrical energy.

In S303, it is controlled to transmit the electrical energy on the direct current capacitor to the photovoltaic module.

As another embodiment, while the photovoltaic system forward transmits electrical energy, based on the detected output voltage of the photovoltaic module, the detected output current of the photovoltaic module, the detected output power of the photovoltaic module, the detected input voltage of the direct current capacitor, the detected input current of the direct current capacitor and the detected input power of the direct current capacitor, the amplitudes of the two voltages, the two currents and the two powers corresponding to the preset frequency are calculated to determine whether any of the amplitudes is less than the corresponding threshold.

In a grid connection of the photovoltaic system, an electrical parameter fluctuation corresponding to a power grid frequency may be induced at a direct current side of the inverter. Therefore, the preset frequency may be set as the power grid voltage frequency or the multiple of the power grid voltage frequency, such as 50 Hz or a multiple of 50 Hz. For example, for a single-phase photovoltaic system, the preset frequency may be set as a double frequency of the power grid voltage frequency, 100 Hz, or a quadruple frequency of the power grid voltage frequency, 200 Hz. For a three-phase photovoltaic system, the preset frequency may be set as a triple frequency of the power grid voltage frequency, 150 Hz, a sextuple frequency of the power grid voltage frequency, 300 Hz, or a duodenary frequency of the power grid voltage frequency, 600 Hz. If it is determined in step S301 that the amplitude of the parameter corresponding to the preset frequency is greater than or equal to the threshold, it can be determined that the photovoltaic system operates normally in the grid connection. If it is determined in step S301 that the amplitude of the parameter corresponding to the preset frequency is less than the threshold, it can be determined that the photovoltaic system is off-grid. In this case, it is controlled to reversely transmit the electrical energy, thereby rapidly decreasing the voltage on the direct current bus of the photovoltaic system.

In addition, some characteristic frequencies may be generated in an operation of a power electronic converter (such as the inverter), such as a switch frequency (such as 16 Hz) and a multiple of the switch frequency formed by Pulse-Width Modulation (PWM) chopping, and a specific frequency peak formed by Electro Magnetic Compatibility (EMC) filtering. Therefore, the preset frequency may be set as the characteristic frequency of the inverter or the multiple of the characteristic frequency, such as 161-Hz. If it is determined in step S301 that the amplitude of the parameter corresponding to the preset frequency is greater than or equal to the threshold, it can be determined that the inverter of the photovoltaic system operates normally. If it is determined in step S301 that the amplitude of the parameter corresponding to the preset frequency is less than the threshold, it can be determined that the inverter of the photovoltaic system is shutdown. In this case, it is controlled to reversely transmit the electrical energy, thereby rapidly decreasing the voltage on the direct current bus of the photovoltaic system.

Besides, in a normal operation of the photovoltaic system, some resonance effects may be generated by an inductor L, a capacitor C, a parasitic inductor Le, a parasitic capacitor Ce and the like in the photovoltaic system. Sometimes, resonance effects may be also generated at some frequency points during an operation of the power electronic converter. Low impedance may be presented at these resonant frequency points, and accordingly, the electric parameters have large amplitudes at these frequency points. Therefore, the preset frequency may be set as the resonant frequency in the operation of the photovoltaic system. If it is determined in step S301 that the amplitude of the parameter corresponding to the preset frequency is greater than or equal to the threshold, it can be determined that the power electronic converter in the photovoltaic system operates normally. If it is determined in step S301 that the amplitude of the parameter corresponding to the preset frequency is less than the threshold, it can be determined that the photovoltaic system does not operate. In this case, it may be controlled to reversely transmit the electrical energy, thereby rapidly decreasing the voltage on the direct current bus of the photovoltaic system.

In the above embodiment, sometimes, a large detection error may be caused by factors such as line attenuation, in a case of a high preset frequency. Therefore, a relative value may be used for the determination. In other words, a frequency band $fL\sim fH$ is set, and the preset frequency is in a range of fL to fH. Assuming that a voltage V is selected as the electrical parameter, an amplitude Vf of the voltage V at the preset frequency is calculated, and a sum Vf2 of amplitudes of the electrical parameter corresponding to the frequency band $fL\sim fH$, is calculated. Then, Vf/Vf2 is compared with a threshold k. If Vf/Vf2<k, it is indicated that the ratio of the amplitude of the voltage at the preset frequency to the sum of the amplitudes of the voltage corresponding to the frequency band is small. In this case, it is considered that the photovoltaic system is not grid-connected or in a stopped state, and it is controlled to reversely transmit the electrical energy. The same is also true for current and power, which is not repeated herein.

Alternatively, the preset electrical energy reverse flow condition may include that a reverse electrical energy transmission control instruction is received.

Figure 5:
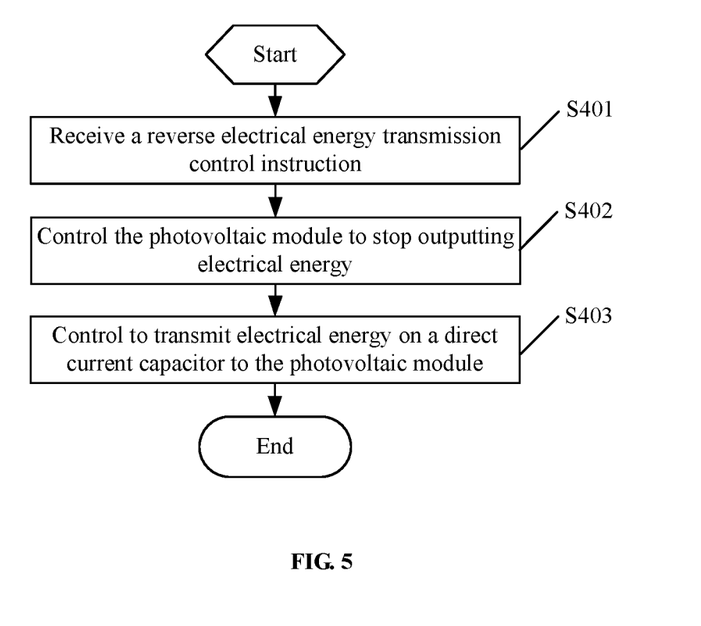
FIG. 5 is a flowchart of an electrical energy control method for a photovoltaic system according to an embodiment of the present disclosure.

Therefore, an electrical energy control method for the photovoltaic system is further provided according to an embodiment of the present disclosure. The method includes steps S401 to S403, as shown in FIG. 5.

In S401, a reverse electrical energy transmission control instruction is received.

In S402, the photovoltaic module is controlled to stop outputting electrical energy to the inverter.

In S403, it is controlled to transmit the electrical energy on the direct current capacitor to the photovoltaic module.

As another embodiment, the reverse electrical energy transmission control instruction may be sent from an inverter, a gateway, a central controller monitoring the whole photovoltaic system and the like in the photovoltaic system. Alternatively, the reverse electrical energy transmission control instruction may be generated by an external button control or external switch control, which is not limited herein. The source of the reverse electrical energy transmission control instruction may be determined according to an application environment, which all fall within the protection scope of the present disclosure.

The reverse electrical energy transmission control instruction may be transmitted by at least one of wired communication such as RS485, RS232 and controller area network (CAN) communications, wireless communication such as Wireless Fidelity (WIFI), Zigbee and Lora communications, and direct current power line carrier communication. The communication mode is not limited herein and may be determined based on an application environment, which all fall within the protection scope of the present disclosure.

In a case that the inverter is shut down or is off-grid, the photovoltaic system may be controlled to reversely transmit the electrical energy by sending the reverse electrical energy transmission control instruction, to consume the electrical energy stored on the direct current capacitor, thereby decreasing the voltage across the direct current capacitor.

Based on the aforementioned embodiments, preferably, in the electrical energy control method for the photovoltaic system, while controlling the electrical energy on the direct current capacitor to transmit to the photovoltaic module by step S103 in FIG. 1, step S203 in FIG. 3, step S303 in FIG. 4 and step S403 in FIG. 5, an output current of the direct current capacitor, output power of the direct current capacitor, an input current of the photovoltaic module, input power of the photovoltaic module or an input voltage of the photovoltaic module may be limited to prevent the photovoltaic module from absorbing excessive electrical energy.

Preferably, in the electrical energy control method for the photovoltaic system, while controlling the electrical energy on the direct current capacitor to transmit to the photovoltaic module by step S103 in FIG. 1, step S203 in FIG. 3, step S303 in FIG. 4 and step S403 in FIG. 5, a voltage across the direct current capacitor may be controlled to be less than or equal to a first threshold.

In a practical application, in the electrical energy control method for the photovoltaic system, some limitation measurements may be adopted during the reverse transmission of electrical energy, to prevent the photovoltaic module from absorbing excessive electrical energy which may affect the performance or service time of the photovoltaic module.

For example, the input voltage of the photovoltaic module is limited not to exceed a preset threshold voltage, which may be set based on a parameter of the photovoltaic module. For example, the threshold voltage may be set as 38V for the photovoltaic module with an open-circuit voltage of 35V. In this way, the input voltage transmitted from the direct current capacitor to the photovoltaic module is controlled to be in a range from 35V to 38V, which can ensure that the photovoltaic module is in an electrical energy absorbing state without absorbing excessive electrical energy.

Alternatively, by limiting the input power of the photovoltaic module or the output power of the direct current capacitor not to exceed a preset threshold power such as 5 W, it can be ensured that the power absorbed by the photovoltaic module does not exceed 5 W.

Alternatively, by limiting the input current of the photovoltaic module not to exceed a preset threshold current such as 0.2 A, if the input voltage received by the photovoltaic module is 35V, it can be ensured that the power absorbed by the photovoltaic module does not exceed 35*0.2=7 W.

Alternatively, by limiting the output current of the direct current capacitor not to exceed a preset threshold current such as 0.5 A, if a maximum output voltage of the direct current capacitor is 20V, it can be ensured that the power absorbed by the photovoltaic module does not exceed 20*0.5=10 W.

In addition, by directly limiting the voltage across the direct current capacitor not to exceed the first threshold such as 60V, the photovoltaic module can be prevented from absorbing excessive electrical energy, so as not to affect the performance or service time of the photovoltaic module. The first threshold here is just an example, which may be determined based on an application environment and all possible thresholds fall within the protection scope of the present disclosure.

In addition, preferably, in step S103 of controlling to transmit the electrical energy on the direct current capacitor to the photovoltaic module, the electrical energy on the direct current capacitor may be transmitted to the photovoltaic module by a boost conversion.

By transmitting the boosted electrical power on the direct current capacitor to the photovoltaic module, the input voltage of the photovoltaic module can be successfully limited between an open-circuit voltage and the threshold voltage. Therefore, it is ensured that the photovoltaic module is in the electrical energy absorbing state without absorbing excessive electrical energy.

An electrical energy control apparatus for a photovoltaic system is further provided according to an embodiment of the present disclosure. The apparatus includes a power transmission circuit and a controller.

The controller is configured to perform the electrical energy control method for the photovoltaic system according to any one of the aforementioned embodiments.

Specifically, the controller is configured to determine whether a preset electrical energy reverse flow condition is met. If the preset electrical energy reverse flow condition is met, the controller controls a switch in the power transmission circuit to switch off, to stop a photovoltaic module from outputting electrical energy, and controls the power transmission circuit to reversely transmit electrical energy on a direct current capacitor to the photovoltaic module.

The preset electrical energy reverse flow condition may be that a voltage across the direct current capacitor is greater than a first threshold or less than a second threshold.

Alternatively, the preset electrical energy reverse flow condition may be that output power of the photovoltaic module is less than a third threshold, or an output current of the photovoltaic module is less than a fourth threshold.

Alternatively, the preset electrical energy reverse flow condition may be that an amplitude of an electrical parameter corresponding to a preset frequency is less than a threshold, or a ratio of an amplitude of an electrical parameter corresponding to the preset frequency to a sum of amplitudes of the electrical parameter corresponding to a preset frequency band is less than a threshold.

The preset frequency is a multiple of a power grid voltage frequency, a multiple of a characteristic frequency of an inverter or a multiple of a resonant frequency of a photovoltaic system.

The electrical parameter is an input voltage of the direct current capacitor, an input current of the direct current capacitor, input power of the direct current capacitor, an output voltage of the photovoltaic module, an output current of the photovoltaic module or output power of the photovoltaic module.

Alternatively, the preset electrical energy reverse flow condition may be that a reverse electrical energy transmission control instruction is received.

Preferably, the reverse electrical energy transmission control instruction is received by at least one of a wired communication, a wireless communication, a direct current power line carrier communication, an external button control and an external switch control.

Preferably, the controller is further configured to, while controlling the power transmission circuit to reversely transmit the electrical energy on the direct current capacitor to the photovoltaic module, limit an output current of the direct current capacitor, output power of the direct current capacitor, an input current of the photovoltaic module, input power of the photovoltaic module or an input voltage of the photovoltaic module, to prevent the photovoltaic module from absorbing excessive electrical energy.

Preferably, the controller is configured to control the power transmission circuit to reversely transmit the electrical energy on the direct current capacitor to the photovoltaic module by a boost conversion.

The power transmission circuit includes a controllable switch S2 configured to switch off in response to a control from the controller, to stop the photovoltaic module from outputting the electrical energy to an inverter.

The power transmission circuit includes a DC/DC converter 100 configured to reversely transmit electrical energy in response to a control from the controller, to transmit the electrical energy on the direct current capacitor to the photovoltaic module.

The electrical energy control apparatus has one end connected to the photovoltaic module, and the other end arranged with a direct current capacitor C, as shown in FIG. 6 to FIG. 10. In a photovoltaic string, the direct current capacitors C in all the electrical energy control apparatuses for the photovoltaic system are connected in series to each other to form a series branch, and two ends of the series branch serve as output ends of the photovoltaic string.

Figure 6:
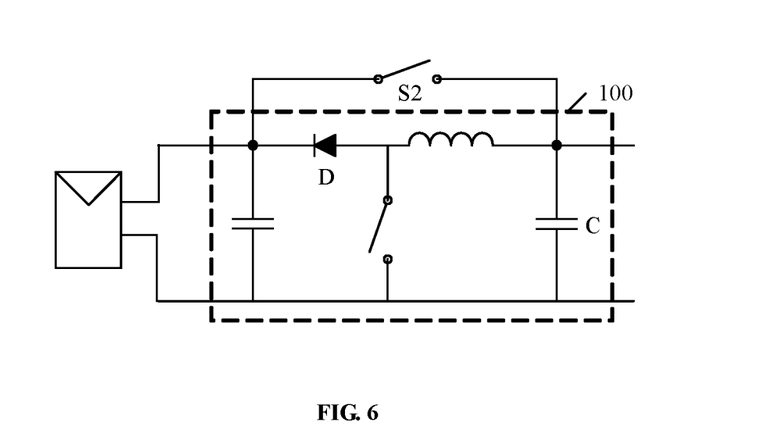
FIG. 6 is a schematic structural diagram of an electrical energy control apparatus for a photovoltaic system according to an embodiment of the present disclosure.

Referring to FIG. 6, the controllable switch S2 may be separate from the DC/DC converter 100. The electrical power of the photovoltaic module is transmitted forward to the outside when the controllable switch S2 is switched on. The electrical energy stored on the direct current capacitor C is transmitted reversely to the photovoltaic module via the DC/DC converter 100 when the controllable switch S2 is switched off.

Figure 7:
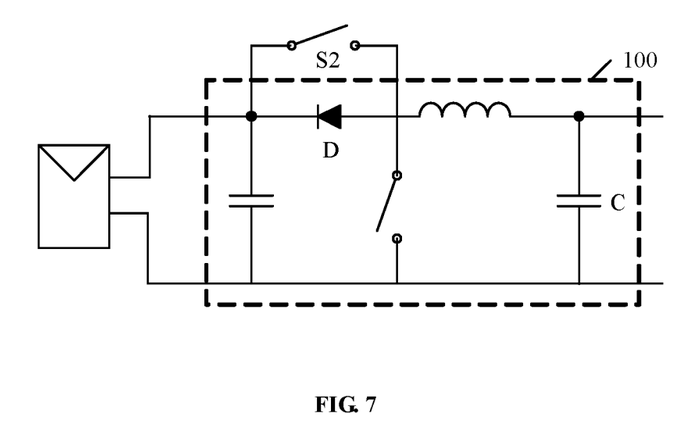
FIG. 7 is a schematic structural diagram of an electrical energy control apparatus for a photovoltaic system according to an embodiment of the present disclosure.

Alternatively, referring to FIG. 7, the controllable switch S2 may also be connected in parallel with a part of the circuit of the DC/DC converter. For example, the controllable switch S2 is directly connected across a freewheel diode D. The connection of the controllable switch S2 is not limited herein and may be determined based on an application environment.

The controllable switch S2 may be various switches such as a relay, a Metallic Oxide Semiconductor Field Effect Transistor (MOSFET) or an Insulated Gate Bipolar Transistor (IGBT), which is not limited herein. All possible solutions fall within the protection scope of the present disclosure.

Figure 8:
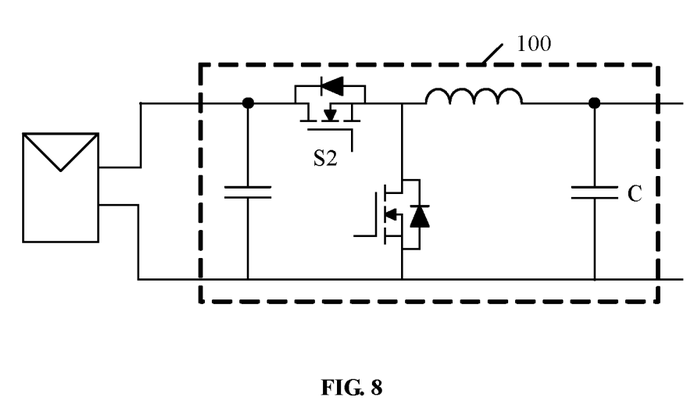
FIG. 8 is a schematic structural diagram of an electrical energy control apparatus for a photovoltaic system according to an embodiment of the present disclosure.

Preferably, as shown in FIG. 8, the DC/DC converter 100 may be a half-bridge converter with a function of bidirectional electrical energy conversion.

The controllable switch S2 may be the MOSFET or IGBT arranged in the half-bridge converter. The half-bridge converter operates in a boost mode and transmits the electrical energy on the direct current capacitor C to the photovoltaic module.

Figure 9:
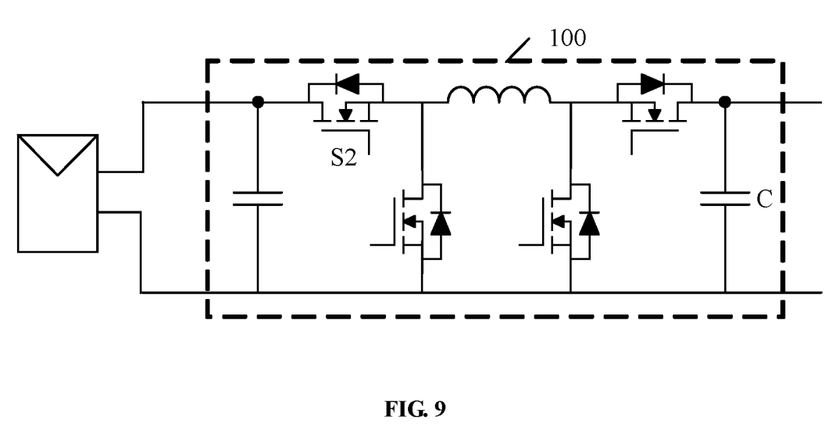
FIG. 9 is a schematic structural diagram of an electrical energy control apparatus for a photovoltaic system according to an embodiment of the present disclosure.
Figure 10:
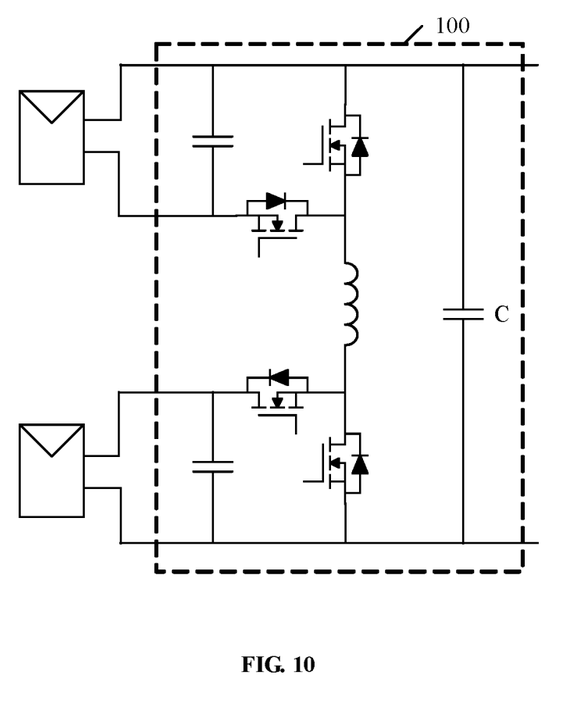
FIG. 10 is a schematic structural diagram of an electrical energy control apparatus for a photovoltaic system according to an embodiment of the present disclosure.

In addition, as shown in FIG. 9, the DC/DC converter 100 may be implemented as a symmetrical BuckBoost converter. In this case, the controllable switch S2 is also a switch in the converter.

In a practical application, a position of the controllable switch S2 may be determined based on an application environment, and all possible positions fall within the protection scope of the present disclosure.

It should be noted that, the DC/DC converter 100 may include multiple output ends respectively connected to corresponding photovoltaic modules. For example, the DC/DC converter 100 may include two output ends each connected to one photovoltaic module. The DC/DC converter 100 may include two independent DC/DC converters inside, or, as shown FIG. 10, include a cascade half-bridge converter with one input end and two output ends.

The other operating principles are the same as those described in the aforementioned embodiments, and are not described in detail herein.

The embodiments of the present disclosure are described in a progressive manner. Each embodiment mainly focuses on an aspect different from other embodiments, and reference can be made one to another for similar parts among the embodiments. The apparatus disclosed in the embodiments corresponds to the method disclosed in the embodiments, and thus is described relatively simple. For detailed description of the apparatus, reference may be made to the related description of the method.

The foregoing embodiments are only preferred embodiments of the present disclosure, and do not limit the present disclosure in any form. The preferred embodiments according to the disclosure are disclosed above, and are not intended to limit the present disclosure. With the method and technical content disclosed above, those skilled in the art can make some variations and improvements to the technical solutions of the present disclosure, or make some equivalent variations on the embodiments without departing from the scope of technical solutions of the present disclosure. All simple modifications, equivalent variations and improvements made based on the technical essence fall in the scope of the technical solutions of the disclosure.

The invention claimed is:

1. An electrical energy control method for a photovoltaic system, applied to an electrical energy control apparatus, wherein the electrical energy control apparatus has one end connected to a photovoltaic module and the other end arranged with a direct current capacitor, and the electrical energy control method for the photovoltaic system comprises:
    determining, by the electrical energy control apparatus, whether a preset electrical energy reverse flow condition is met;
    controlling the photovoltaic module to stop outputting electrical energy, if the electrical energy control apparatus determines that the preset electrical energy reverse flow condition is met; and
    controlling to transmit electrical energy on the direct current capacitor to the photovoltaic module, wherein the preset electrical energy reverse flow condition is one of the following conditions;
    a voltage across the direct current capacitor is greater than a first threshold or less than a second threshold, the first threshold being greater than the second threshold; or
    output power of the photovoltaic module is less than a third threshold or an output current of the photovoltaic module is less than a fourth threshold; or
    an amplitude of an electrical parameter corresponding to a preset frequency is less than a threshold, or a ratio of an amplitude of an electrical parameter corresponding to the preset frequency to a sum of amplitudes of the electrical parameter corresponding to a preset frequency band is less than a threshold, wherein the preset frequency is a multiple of a power grid voltage frequency, a multiple of a characteristic frequency of an inverter, or a multiple of a resonant frequency of the photovoltaic system, and the electrical parameter is an input voltage of the direct current capacitor, an input current of the direct current capacitor, input power of the direct current capacitor, an output voltage of the photovoltaic module, an output current of the photovoltaic module, or output power of the photovoltaic module; or a reverse electrical energy transmission control instruction is received.

2. The electrical energy control method for the photovoltaic system according to claim 1, wherein the reverse electrical energy transmission control instruction is received by at least one of a wired communication, a wireless communication, a direct current power line carrier communication, an external button control and an external switch control.

3. The electrical energy control method for the photovoltaic system according to claim 1, while controlling to transmit the electrical energy on the direct current capacitor to the photovoltaic module, further comprising:
limiting an output current of the direct current capacitor, output power of the direct current capacitor, an input current of the photovoltaic module, input power of the photovoltaic module or an input voltage of the photovoltaic module, to prevent the photovoltaic module from absorbing excessive electrical energy.

4. The electrical energy control method for the photovoltaic system according to claim 1, while controlling to transmit the electrical energy on the direct current capacitor to the photovoltaic module, further comprising:
controlling a voltage across the direct current capacitor to be less than or equal to a first threshold.

5. The electrical energy control method for the photovoltaic system according to claim 1, wherein the controlling to transmit the electrical energy on the direct current capacitor to the photovoltaic module comprises:
controlling to transmit the electrical energy on the direct current capacitor to the photovoltaic module by a boost conversion.

6. An electrical energy control apparatus, comprising:
an end connected to a photovoltaic module;
a direct current capacitor arranged on the other end of the electrical energy control apparatus;
a power transmission circuit, and
a controller, wherein
the controller is configured to determine whether a preset electrical energy reverse flow condition is met; and
the power transmission circuit comprises:
a controllable switch, configured to switch off in response to the controller determining the preset electrical energy reverse flow condition is met, to stop the photovoltaic module from outputting electrical energy; and
a direct-current/direct-current (DC/DC) converter, configured to transmit the electrical energy on the direct current capacitor to the photovoltaic module, wherein the preset electrical energy reverse flow condition is one of the following conditions:
a voltage across the direct current capacitor is greater than a first threshold or less than a second threshold, the first threshold being greater than the second threshold; or
output power of the photovoltaic module is less than a third threshold or an output current of the photovoltaic module is less than a fourth threshold; or
an amplitude of an electrical parameter corresponding to a preset frequency is less than a threshold, or a ratio of an amplitude of an electrical parameter corresponding to the preset frequency to a sum of amplitudes of the electrical parameter corresponding to a preset frequency band is less than a threshold, wherein the preset frequency is a multiple of a power grid voltage frequency, a multiple of a characteristic frequency of an inverter, or a multiple of a resonant frequency of the photovoltaic system, and the electrical parameter is an input voltage of the direct current capacitor, an input current of the direct current capacitor, input power of the direct current capacitor, an output voltage of the photovoltaic module, an output current of the photovoltaic module, or output power of the photovoltaic module; or
a reverse electrical energy transmission control instruction is received.

7. The electrical energy control apparatus according to claim 6, wherein
the DC/DC converter is a half-bridge converter with a function of bidirectional electrical energy conversion; and
the controllable switch is a Metallic Oxide Semiconductor Field Effect Transistor (MOSFET) or an Insulated Gate Bipolar Transistor (IGBT) arranged in the half-bridge converter, and the controllable switch further comprises a body diode configured to transmit the electrical energy on the direct current capacitor to the photovoltaic module.

8. The electrical energy control apparatus according to claim 6, wherein the reverse electrical energy transmission control instruction is received by at least one of a wired communication, a wireless communication, a direct current power line carrier communication, an external button control and an external switch control.

9. The electrical energy control apparatus according to claim 6, wherein the controller is further configured to:
limit an output current of the direct current capacitor, output power of the direct current capacitor, an input current of the photovoltaic module, input power of the photovoltaic module or an input voltage of the photovoltaic module, to prevent the photovoltaic module from absorbing excessive electrical energy.

10. The electrical energy control apparatus according to claim 6, wherein the controller is further configured to:
control a voltage across the direct current capacitor to be less than or equal to a first threshold.

11. The electrical energy control apparatus according to claim 6, wherein the controller is further configured to:
control to transmit the electrical energy on the direct current capacitor to the photovoltaic module by a boost conversion.

* * * * *